United States Patent

[11] 3,620,995

[72] Inventor Laurence F. King
Mooretown, Lambton, Ontario, Canada
[21] Appl. No. 804,706
[22] Filed Mar. 5, 1969
[45] Patented Nov. 16, 1971
[73] Assignee Esso Research and Engineering Company

[54] VINYL CHLORIDE HOMO- AND COPOLYMERS STABILITY
3 Claims, No Drawings
[52] U.S. Cl.................................................. 260/45.85,
260/45.7 R, 260/45.9 R, 260/45.95, 260/92.8 A
[51] Int. Cl........................................................ C08f 45/58
[50] Field of Search........................................... 260/45.7 R,
45.85, 45.9, 45.95, 92.8 A

[56] References Cited
UNITED STATES PATENTS
| | | | |
|---|---|---|---|
| 2,462,422 | 2/1949 | Plambeck..................... | 260/45.9 |
| 2,536,114 | 1/1951 | Weaver et al................ | 260/92.8 |
| 3,285,855 | 11/1966 | Dexter et al. ................ | 260/45.85 |

Primary Examiner—Donald E. Czaja
Assistant Examiner—V. P. Hoke
Attorneys—Chasan and Sinnock and Michael N. Meller ABSTRACT: Homopolymers and copolymers of vinyl chloride with vinylidene chloride, vinyl acetate, propylene, acrylates and methacrylates are treated as a slurry with
  a. a 0.1-10 percent solution of an alkaline, water-soluble hydroxide in order to remove undesirable side products of polymerization tending to degrade the polymer, and
  b. a phenolic antioxidant such as a bis or tris phenol or a salt, thio- or carboxylic acid derivative thereof.

VINYL CHLORIDE HOMO- AND COPOLYMERS STABILITY

BACKGROUND OF THE INVENTION

1. Field of Invention

This invention relates to the stabilization of resinous compositions containing primarily homo and copolymers of vinyl chloride, hereinafter designated as PVC compounds. More specifically the invention relates to the processability of PVC as indicated by the dynamic mill stability of compositions made by suspension and emulsion polymerization reactions.

PVC, particularly in rigid formulations, is more difficult to process than many other resins because of the tendency for HCl to be liberated at the high temperatures required. For each mole of HCl lost an olefinic bond appears in the polymer backbone, and after about seven conjugated double bonds have been formed, probably by a "zipper" mechanism, color formation due to the polyene structure becomes appreciable. Conventional stabilizers—organotins, heavy metal salts, epoxides, phosphites, etc.—retard thermal degradation during processing, but do not eliminate it entirely. A recently published comprehensive review on the mechanism of PVC degradation by W. C. Geddes in Rubber Chemistry and Technology 40, No. 1, p. 177 (1967) points out that the susceptibility to thermal breakdown is due primarily to structural irregularities in the polymer. These structural irregularities affecting the thermal stability of PVC can be listed as follows:
a. initiator residues
b. unsaturated end groups
c. branch points
d. random unsaturation
e. oxidized structures
f. head-to-head units
g. stereoconfiguration
h. extraneous impurities The atmosphere in contact with the resin during any processing sequence also has a marked effect on the rate surface area of the polymer being processed varies considerably from one machine to another. On a mill or calendar, the ratio is high whereas in a press it is relatively low. Because of operating differences, laboratory test procedures, particularly static tests such as oven stability, do not always correlate well with commercial practice.

2. Description of the Prior Art

In an effort to cure these problems, the prior art has attempted to stabilize PVC degradation such as for example by the use of multivalent metal phenolates or carboxylates with bisphenols as described in Darsa, U.S. Pat. No. 3,225,001, or by the addition of alkali metal phosphates such as potassium or lithium phosphates as set out in Haefner et al., U.S. Pat. No. 2,868,765. These materials, while highly useful for product stability in use of such materials as wire and cable coatings and the like where high-temperature characteristics are necessary, do not serve very well during processing of these compounds and thus to give dynamic mill stability it is necessary to use other and more effective antioxidant formulations. Furthermore, inorganic salts such as the phosphates, since they are completely insoluble in PVC, impart undesirable haziness to clear, transparent compounds and may be leached from the resin by water during end use.

The inventor's investigation has shown that the function of antioxidants herein is twofold: (a) during treatment of a resin with specified chemical agents such as alkali metal hydroxides, it prevents color degradation which would render the resin useless for subsequent compounding; and (b) during the processing step. Phenolic-type antioxidants are more effective in some formulations than in others. In flexible formulations containing metallic soaps (which serve as both lubricant and stabilizer) antioxidants are extremely effective in preventing the compound from sticking to metal surfaces during processing. In most rigid compounds, in which free fatty acids are almost universally used as the major lubricant, antioxidants are without effect except when employed in conjunction with an alkaline reagent, as will be shown herein.

Suitable chemical treatment of PVC under relatively mild conditions induces some controlled dehydrochlorination of the resin and removes trace impurities. The result is improved clarity of the product in some instances and better thermal stability as indicated by most tests. Aqueous alkaline solutions in the presence of an antioxidant appear to "refine" the resin by removing the most labile chlorine atoms along with suspending and emulsifying agent residues and other extraneous impurities such as initiator residues without adversely affecting particle size, porosity or color.

It is well known that the metallic stabilizer and the lubricant used are both important in determining processability of a compound. In some cases the presence of an antioxidant was found to have a further, major effect on heat stability; in others, changes induced by alkali treating were greater, while in still other formulations, both methods of treatment appeared advantageous.

This invention is based on the theory which applicant hereby is advancing merely as a means of explanation, but does not wish to be bound by, that the labile chlorine atoms are removed from the PVC by a controlled dehydrochlorination process and immediately replaced with other more stable atoms. Thus, the thermal stability of PVC is greatly enhanced without concomitant color degradation. This is in part the theoretical basis of stabilization by metal carboxylates, mercaptides, etc., (which are normally added at a later stage) whereby ester or mercapto groups become chemically bonded to the polymer chain during processing.

In practice, controlled dehydrochlorination of PVC is extremely difficult. Once started, dehydrochlorination becomes very rapid at elevated temperatures and color formation due to the polyene structure soon becomes appreciable unless exceptional treating methods are employed.

It is the purpose, therefore, of this invention to set forth a novel way of treating PVC compounds subsequent to polymerization with a combination of an alkaline hydroxide in aqueous solution and an antioxidant so as to dehydrochlorinate PVC without color degradation and further, to impart thereby improved processability characteristics to the resin after compounding in the usual manner, as determined by dynamic mill stability.

SUMMARY OF THE INVENTION

Briefly this invention relates to a process of improving the heat stability of PVC-type compounds during processing by treating them with 0.1 to 10 percent of a water-soluble hydroxide selected from the group consisting of sodium hydroxide, potassium hydroxide, ammonium hydroxide, lithium hydroxide, calcium hydroxide and barium hydroxide in a solution having a pH in the range of 7 to 12 in order to induce controlled dehydrochlorination and to remove undesirable side products of polymerization tending to degrade PVC polymers. These undesirables would include polyvinylalcohols, gelatin, methyl cellulose, carboxy methyl cellulose, hydroxy ethyl cellulose which are commonly used as suspending agents and remain adsorbed to or grafted on the polymer, and other hydrolyzable materials which are produced as part of the polymerization process, such as initiator residues (acetyl or ester groups) attached to the polymer, or in the case of copolymers, unreacted comonomer such as vinyl acetate. The secondary treatment involves the additional stabilizing action of a phenolic antioxidant such as a bis or tris phenol or a derivative thereof.

It has been found by the inventor, quite surprisingly, that heat treating a commercial suspension of PVC resin in the form of a slurry at relatively low temperatures ranging from 40°–150° C. with a dilute aqueous solution of an alkali such as sodium or ammonium hydroxide in an inert in an inert atmosphere results in a greatly accelerated rate of dehydrochlorination as compared to using weaker bases.

Depending on the temperature and the amount and kind of alkali used, the dehydrochlorination rate is 5 to 25 times that obtained during the same heat treatment under nitrogen by prior techniques. In spite of the loss of HCl resin color and other particle properties are not adversely affected. In fact, resin particle porosity is often increased due to the penetrating action of the aqueous solution and this is desirable for better processability and easier absorption of plasticizer.

In the same treating step proposed, the partially dehydrochlorinated resin is reacted with such antioxidants as phenols to introduce chemical groups on the PVC backbone or absorb them strongly on the polymer thereby providing internal stabilization. Although the exact mechanism is unknown, color degradation is effectively prevented, particularly at a pH value between 7 and 10. Other (desirable) chemical reactions such as decomposition of suspending agent residues are not inhibited, as shown by the fact that significant amounts of acetaldehyde and acrolein are evolved from polyvinyl alcohol suspending agents and methanol from methyl cellulose. Removal of these contaminants materially improves the thermal stability of the resin.

The process in general contemplates treating under nitrogen a water-suspended PVC resin with 0.1 to 10 percent of resin of alkaline reagent and an amount of approximately 0.05 to 0.5 parts of a bis or tris phenol antioxidant at a temperature ranging from 40° to 150° C. and for a period of time ranging from 0.1 to 20 hours, followed by water washing to remove excess alkaline reagent, alkali metal chlorides and other water soluble products.

The resin employed may be any homopolymer of vinyl chloride or copolymers of vinyl chloride with vinylidene chloride, vinyl acetate, propylene, alkyl vinyl ether, acrylate and methacrylate and other similar type of monomers.

The slurry medium would generally be water and it would be employed in 0.5 to 2 parts per part of resin depending upon the viscosity of the medium.

The alkali employed would generally be sodium hydroxide, but other similar hydroxides such as potassium, ammonium, lithium, barium and calcium hydroxide would also be useful.

As the phenolic-type antioxidant there may be employed compounds such as

I. 4,4' isopropylidene bisphenol
II. 4-bis (p-hydroxy phenyl) pentanoic acid
III. 4,4' thiobis (6-tert. butyl m-cresol)
IV. tetrakis [methylene 3-(3',5' di-tert. butyl, 4'-hydroxy phenyl) propionate] methane The process parameters for the postpolymerization antioxidation treatment would be a temperature range from ambient to 150° C. with a preferred temperature range between 35° and 75° C. The pressures at which the reaction would be performed would range from atmospheric to 200 p.s.i. and preferably from atmospheric to 100 p.s.i. The contact times may range from 0.1 to 20 hours and preferably from 0.1 to 2 hours.

The critical pH range is between 7 and 12 for dehydrochlorination of PVC. Anything over a pH of 12 would tend to degrade the polymer by starting off the "zipper" mechanism with too much polyene formation becoming evident. The preferred pH range is 8 to 9 at 35-75° C. and a contact time of about 2 hours. A pH range of between 9 and 12 can be employed if the temperature is below 35° C. and/or the contact time is less than about 2 hours. Conversely, at high temperatures the pH range should be between 8 and 9 and the contact time only about 0.1 hour. Resin color degradation is the criterion used.

This process, for both the rigid and flexible PVC compounds, provides better clarity and heat stability during processing as well as better resistance to oxidation.

Examples of useful materials made from PVC compounds processed according to this invention involve plastic bottles, pipe, articles, calendered film, floor tile, blown film, etc.

DESCRIPTION OF THE PREFERRED EMBODIMENT

This invention and its advantages will be better understood by reference to the following examples:

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Treat: | | | | | | | | | | | | |
| PVC homopolymer | 100 | 100 | 100 | 100 | 100 | 100 | 100 | 100 | 100 | | | |
| PVC copolymer [1] | | | | | | | | | | 100 | 100 | 100 |
| Water | | 100 | 100 | 100 | 100 | 100 | 100 | | 100 | | 100 | 100 |
| Sodium hydroxide | | 1 | 1 | | | | | | | | 1 | 0.1 |
| Ammonium hydroxide [2] | | | | | 1.5 | 1.5 | 1.5 | | 1.5 | | | |
| Antioxidant [3] | | | | 0.1 | 0.1 | | 0.1 | | 0.1 | | 0.1 | 0.1 |
| pH of aq. medium | | 6.5 | 11 | 11 | 9 | 9 | 9 | | 9 | | 12 | 10 |
| Temperature, ° C | | 80 | 65 | 65 | 60 | 88 | 88 | | 60 | | 40 | 65 |
| Contact time, hrs | | 2 | 2 | 2 | 2 | 2 | 2 | | 2 | | 2 | 2 |
| Dehydrochlorination percent | | | | | 1.5 | 1.6 | 1.6 | | | | | |
| Resin color | White | Pink | Pink | White | White | Pink | White | White | White | White | White | White |
| Formulation: | | | | | | | | | | | | |
| Resin | 100 | | | 100 | 100 | | 100 | 100 | 100 | 100 | 100 | 100 |
| Alkyl tin mercaptide [4] | 3 | | | 3 | 3 | | 3 | 3 | 3 | 3 | 3 | 3 |
| Stearic acid | 1 | | | 1 | 1 | | 1 | | | 1 | 1 | 1 |
| 12-hydroxy stearic acid | | | | | | | | 1 | 1 | | | |
| Evaluation: | | | | | | | | | | | | |
| Oven test life, 177° C., mins | 150 | | | 400 | | | | | | | | |
| Dynamic mill stability, 177° C.: | | | | | | | | | | | | |
| Clarity loss, mins. [5] | 65 | | | 80 | 85 | | 85 | 90 | 135 | 20 | 31 | 42 |
| Life, mins | 165 | | | 180 | 230 | | 230 | 180 | 255 | | | |

[1] Polyvinyl chloride, 15% poluvinyl acetate.
[2] 5 parts of 29% NH₄OH solution.
[3] Tetrakis [methylene 3-(3',5' di-tert. butyl, 4' hydroxy phenyl) propionate] methane.
[4] $R\!-\!Sn(SR')_2 \cdot R'$ ... where R and R' are alkyl groups.
[5] Time to reach 0.1 absorbance (79% light transmission) measured by spectropothometer at 476 mμ on specimen 0.010" thick.

Example 1 is an untreated homopolymer compounded with a stabilizer and a lubricant in the usual manner. The data shown were obtained in the oven stability and dynamic mill stability tests. Example 2 is the same resin treated for 2 hours with water alone at 80° C. and shows pink discoloration due to thermal degradation which would render it unsuitable for processing and fabrication. Example 3 shows that sodium hydroxide treatment without antioxidant gives similar color degradation, and example 4 indicates the beneficial results of sodium hydroxide treatment in the presence of an antioxidant whereby discoloration is prevented and the heat stability is significantly improved, as measured by both static and dynamic tests. Examples 5, 6 and 7 demonstrate a parallel effect with ammonium hydroxide solution and further indicate the extent of dehydrochlorination achieved. The increase in dynamic mill test life for 5 and 7 as compared to example 1 is of the order of 40 percent. In examples 8 and 9 a slight modification in the compounding ingredients was made by replacing stearic acid with 12-hydroxy stearic acid and the improvement due to ammonium hydroxide treating in the presence of the phenolic antioxidant is about the same (40 percent). The remaining three examples 10, 11, and 12 are for a vinyl chloride—vinyl acetate copolymer. They show the effect of sodium hydroxide treating at two pH levels, 12 and 10, and indicate an improved performance at the lower pH level. The time for loss of clarity was extended by 50 to 100 percent which is of the greatest importance in processing of all PVC resins.

It is to be understood that this invention is not limited to specific examples set forth herein, which have been offered merely as illustration, and that modifications may be made without departure from the spirit and scope of the appended claims.

What is claimed is:

1. In a process for producing a stabilized polymer selected from the group consisting of homopolymers of vinyl chloride and copolymers of vinyl chloride with vinylidene chloride, vinyl acetate, propylene, acrylates and methacrylates prepared by suspension polymerization and using suspending agents selected from the group consisting of polyvinyl alcohols, gelatin, methyl cellulose, carboxy methyl cellulose and hydroxy ethyl cellulose, the improvement which comprises hydrolyzing the residues of said suspending agents and preventing color degradation by treating an aqueous suspension of said polymer in an inert atmosphere with:
   a. a 0.1 to 10 percent aqueous solution of an alkaline hydroxide having a pH in the range of 7.0 to 12.0, in combination with,
   b. 0.05 to 5 parts of a phenolic antioxidant selected from the group consisting of bis and tris phenols and their salts,
   at a temperature of from 40° to 150° C. for 0.1 to 20 hours followed by water washing and recovery of the polymer.

2. The process of claim 1 wherein the alkaline hydroxide is selected from the group consisting of sodium hydroxide, potassium hydroxide, ammonium hydroxide, lithium hydroxide, calcium hydroxide and barium hydroxide.

3. The process of claim 1 wherein said phenolic antioxidant is tetrakis [methylene 3-(3',5' di-tert. butyl, 4' hydroxy phenyl)propionate] methane and said alkaline hydroxide is sodium hydroxide or ammonium hydroxide.

* * * * *